United States Patent [19]

Simjian

[11] 4,218,011
[45] Aug. 19, 1980

[54] COUPON CONTROLLED METERING DEVICE

[76] Inventor: Luther G. Simjian, Lago Mar Place, 1750 S. Ocean La., Fort Lauderdale, Fla. 33316

[21] Appl. No.: 39,170

[22] Filed: May 15, 1979

[51] Int. Cl.³ ...................... G06F 15/20; G06K 15/00
[52] U.S. Cl. ..................................... 235/375; 235/432
[58] Field of Search ............... 235/375, 380, 381, 419, 235/432; 340/147 R, 152 R

[56] References Cited

U.S. PATENT DOCUMENTS

| | | | |
|---|---|---|---|
| 3,255,439 | 6/1966 | Simjian | 340/147 R |
| 3,501,744 | 3/1970 | Simjian | 340/152 R |
| 3,792,446 | 2/1974 | McFiggins et al. | 364/900 |

Primary Examiner—Daryl W. Cook

[57] ABSTRACT

A postage meter is used in conjunction with a coupon which serves for updating, i.e. increasing the credit register, by a predetermined sum of money. Means are provided to invalidate the coupon after use and to provide the coupon with data indicative of the status of the register.

12 Claims, 3 Drawing Figures

COUPON CONTROLLED METERING DEVICE

SUMMARY OF THE INVENTION

This invention refers to metering devices which are adapted to dispense a unit of value in response to being charged with a sum of money. Typical of such devices is the commercially used postage metering device which is adapted to imprint variable amounts of postage on envelopes and tapes as long as the credit balance remains above a predetermined sum of money. When the predetermined minimum credit balance is reached, the meter is inhibited from imprinting further postage. At that time or at some time prior to reaching the minimum credit balance the meter must be recharged, that is, the credit register must be set to a monetary value in excess of the minimum balance. Such recharging most commonly is done by bringing the removable register portion of the metering device to the Post Office and upon paying a sum of money, for instance $500.00, an authorized Post Office employee using a special key sets the credit register to a value reflecting the $500 payment. In the recent period a system has come into use in which the meter can be recharged by obtaining a code from a remotely located computer, thus avoiding the need of bringing the register to the Post Office. Illustrative of the various arrangements of postage meters and means for restoring the credit register to a balance above a minimum without bringing the meter to the Post Office are U.S. Pat. Nos. 3,255,439; 3,428,948; 3,501,744; 3,596,247; 3,716,698 and 3,792,446.

The instant invention also overcomes the need for removing the register and bringing it to the Post Office and intead uses a special code means which is purchased from the Post Office or a bank. The code means, for instance a specially coded coupon, is purchased by the meter owner and is used whenever the credit register requires to be reset to reflect an increased credit balance. A coupon of this type may be purchased at the Post Office personally, or may be purchased via the mails.

The present invention, therefore, discloses an arrangement for simplifying the process of recharging the credit register by obviating the need for a trip to the Post Office or the use of computer means. Instead, the present invenion contemplates the use of a coupon which, if found valid, is used to update the credit register to reflect an increase by a predetermined amount of money. Additionally, the invention includes also means for insuring that a coupon is useable only for one charging or a predetermined number of charging operations and then being invalidated. Moreover, means are provided to affix to the coupon when used data indicative of th status of the register, thus providing a record of the postage dispensed by the particular meter. This recording closely represents the present requirement where the Post Office must periodically be provided with written data indicating the postage meter usage, that is, the cumulative amount of postage dispensed by the meter installed at a customer. The present invention contemplates that a used coupon with the use data of the meter affixed thereupon must be returned to the Post Office so that the Post Office has in its possession documentary evidence of the meter use.

Other and still further features of the present invention will be more clearly apparent from the following description when taken in conjunction with the accompanying drawings.

DETAILED DESCRIPTION

Figure 1:
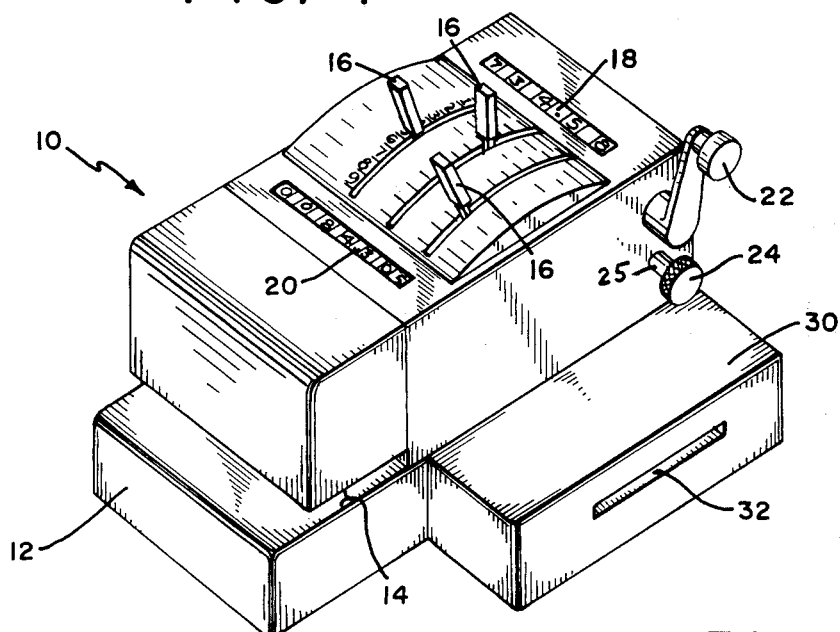
FIG. 1 is a perspective view of the metering device.

Referring now to the figures and FIG. 1 in particular, there is shown a postage meter 10 which includes, quite conventionally, a housing 12 with a slot 14 for receiving therein envelopes or other items upon which a variable amount of postage is to be affixed. There is provided, furthermore, a series of adjustable levers 16 which are movable to the amount of postage to be dispensed. A descending counter 18 displaying numerals in the associated window shows the amount of credit remaining in the credit register while an ascending counter 20 with an associated display window indicates the cumulative amount of postage dispensed. A lever 22 is operable for imprinting the amount of postage set by levers 16 whereupon the counters 18 and 20 forming a part of the register mechanism reflect the changed status of the register, that is, the counter 18 shows the amount of credit remaining in the register whereas the counter 20 indicates the new value of the cumulative amount of postage dispensed. The knob 24 mounted below the lever 22 when turned serves to increase the credit register by a predetermined amount. The mechanism shown hereinabove is substantially the same as is available in the conventional postage meter except that the knob 24 has been repositioned, see for instance U.S. Pat. No. 3,596,247.

The modification of the present arrangement comprises the coupon accepting means 30 extending laterally from the base of the housing 12 and containing additional mechanisms which will be described hereinbelow. The coupon accepting means includes a slot 32 for receiving therein a coupon substantially as shown in FIG. 2.

Figure 2:
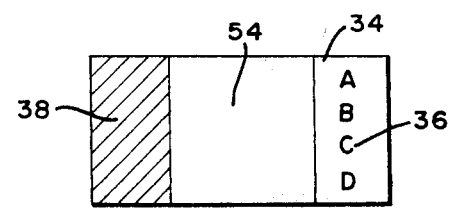
FIG. 2 is a plan view of a typical coupon used for the instant invention.

With reference to FIG. 2, a coupon 34, typically made of safety paper such as is used by banks for checks, is provided with certain imprinted material 36 and coded matter 38. The coded matter may be an imprinted ornamental design similar to that used on paper currency or bank notes, or may include magnetic characters or other coding as is well known to those skilled in the art. A coupon of this type is purchased from the Post Office or some other agency and is necessary for "updating", that is charging, the postage meter for increasing the balance of the credit register by a predetermined sum of money.

Figure 3:
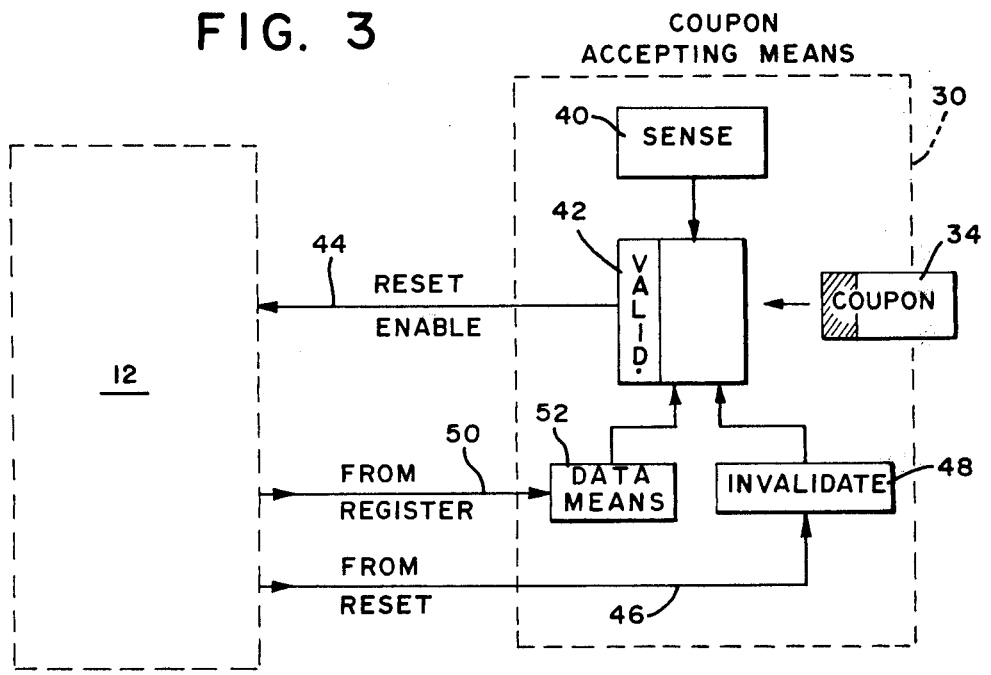
FIG. 3 is a schematic block diagram of the features comprising the present invention.

In order to update the credit register the coupon is inserted into the slot 32 of the coupon accepting means 30. With reference to FIG. 3, a sensing means 40 establishes the presence of the coupon 34 in the coupon accepting means. The sensing means, typically, comprises a microswitch or light responsive control means. The validation means 42 responsive to operation of the sensing means 40 is actuated to sense the coded area 38 on the coupon and to establish the validity of the coupon. If the coupon is deemed invalid, the validation means 42 fails to provide a proper output signal. However, if the coded area 38 is of suitable character and validation is established, the validation means 42 sends a suitable enable signal via conductor 44 to the credit register for causing the shaft 25 of the knob 24 which normally is uncoupled to become coupled to the credit register. Upon rotating the knob 24 while the shaft 25 is coupled, the credit register is increased by a predetermined sum of money whereupon the knob 24 becomes disabled once again. The use of a clutch mechanism for temporarily coupling the shaft 25 to the credit register for charging the credit register is shown, for instance in my previously issued U.S. Pat. No. 3,501,744, FIG. 5, items 82 and 90. Responsive to the resetting of the credit register a signal is furnished via conductor 46 to an invalidating means 48 which acts upon the coded portion 38 of the coupon 34 to cause invalidation of the coupon so as to inhibit subsequent use thereof. In addition, a signal from the register provides along input means 50 data corresponding to the setting of the register to the data means 52 which includes printing means for affixing upon the area 54 of the coupon, see FIG. 2, data responsive to the status of the register, in the preferred embodiment the setting of the ascending counter 20 which contains the cumulative amount of postage imprinted. The data means 52 may be driven mechanically from the register or, alternatively, it can comprise an electrical repeater system which sets printing means to the setting of the counter of the register. The coupon can now be withdrawn from the postage meter and upon its return to the Post Office or to the issuing agency, a new coupon can be purchased to once again charge or reset the credit register. By virtue of the coupon 34 having been provided with data of the register, such as by imprinting the cumulative amount of postage dispensed, the coupon serves the same documentary evidence as is required now by the Post Office where the subscriber periodically must submit a postal card stating the readings of its ascending register for indicating the cumulative amount of postage dispensed.

In an alternative embodiment, the coupon 34 is inserted into the coupon accepting means 30 and upon validation thereof, the credit register is reset as described heretofore, but it is required that the coupon remain inserted for retaining the meter operative. For updating the credit register with a new incremental amount of money, the coupon is withdrawn and a new or second coupon is inserted. However, prior to the withdrawal of the first coupon, responsive to a control mechanism, such as a manually operated push button, the data means 52 is provided with the setting from the register and in turn imprints the numerical data upon the first coupon, whereupon this coupon is ejected and further operation of the postage meter is inhibited and only restored by the second coupon. In this latter embodiment the Post Office receives information of the status of the meter, which information is of a more recent date. However, since the historical record of a postage meter is of importance, it does not appear important as to which of the arrangements is used. In addition, if desired, the data means 52, of course, may include a dating device to affix also the date when the imprinting occurred. Instead of imprinting, the data may be affixed upon the coupon also by a punched code or other coded indicia as is well known to those skilled in the art.

The validation means 42 may comprise in the preferred embodiment photosensitive sensing means of the type used in paper currency changers or magnetic sensing and deciphering means, all as are well known. Similarly, the invalidating means may comprise printing or punching means, demagnetizing means, heating means, or other mutilating means.

As is evident from the above description, the present arrangement overcomes the need for periodically transporting the meter mechanism to the Post Office and instead provides for the use of a coupon which is purchased from the Post Office or some other agency and serves for updating the credit register of the postage meter. Safeguards are provided so that the coupon must be of proper character and is voided after use. By a very simple procedure, for instance by dividing the coupon in two equal parts, it can be arranged that a coupon is useable for two updating operations prior to its becoming no longer useable. In this manner, the coupon can be used twice, or by suitable modifications additional times prior to being rendered invalid.

While there has been described a preferred embodiment of my invention and several modifications have been indicated, it will be apparent to those skilled in the art that various further changes and modifications may be made therein without departing from the principle of the invention which shall be limited only by the scope of the appended claims.

What is claimed is:

1. A metering device of the postage meter type or similar type comprising:

a metering mechanism including printing means for printing adjustable indicia representative of monetary units;

register means including a credit register and a cumulative register coupled to said printing means for registering in response to the operation of said printing means respectively the credit balance remaining in the metering mechanism and the cumulative monetary units printed;

control means coupled to said credit register and said printing means for precluding operation of said printing means when said credit register assumes a condition representative of a minimum credit balance;

resetting means coupled to said credit register for resetting said credit register to a condition representative of an increased credit balance;

coupon accepting means coupled to said metering mechanism for accepting a coupon;

validation means cooperatively associated with said coupon accepting means and coupled to said resetting means for determining the validity of a coupon accepted by said coupon accepting means and in response to a coupon being determined valid rendering said resetting means operable for resetting said credit register to a condition representative of an increased credit balance;

invalidating means coupled to said resetting means and said coupon accepting means for invalidating a coupon determined valid responsive to said resetting means having been rendered operable and reset said credit register, and further means coupled to said resetting means and said register means for providing said coupon with data indicative of the condition of said register means.

2. A metering device of the postage meter type or similar type as set forth in claim 1, said credit register including a descending counter and said cumulative register including an ascending counter.

3. A metering device of the postage meter type or similar type as set forth in claim 2, said further means providing said coupon with data indicative of the condition of said ascending counter.

4. A metering device of the postage meter type or similar type as set forth in claim 2, said validation means sensing a first predetermined area of a coupon and said further means affixing indicia to a second area of the coupon.

5. A metering device of the postage meter type or similar type as set forth in claim 2, said resetting means including clutch means.

6. A metering device of the postage meter type or similar type as set forth in claim 5, said clutch means being an electromagnetic clutch.

7. A metering device of the postage meter type or similar type as set forth in claim 5, said resetting means including a manually operable control.

8. A metering device of the postage meter type or similar type as set forth in claim 2, said resetting means when operated resetting said descending counter by a predetermined increment.

9. A metering device of the postage meter type or similar type comprising:
   a metering mechanism including printing means for printing adjustable indicia representative of monetary units;
   register means including a credit register and a cumulative register coupled to said printing means for registering in response to the operation of said printing means respectively the credit balance remaining in the metering mechanism and the cumulative monetary units printed;
   control means coupled to said credit register and said printing means for precluding operation of said printing means when said credit register assumes a condition representative of a minimum credit balance;
   resetting means coupled to said credit register for resetting said credit register to a condition representative of an increased credit balance;
   coupon accepting means coupled to said metering mechanism for accepting a coupon;
   validation means cooperatively associated with said coupon accepting means and coupled to said resetting means for determining the validity of a coupon accepted by said coupon accepting means and in response to a coupon being determined valid rendering said resetting means operable for resetting said credit register to a condition representative of an increased credit balance, and
   invalidating means coupled to said resetting means and said coupon accepting means for invalidating a coupon determined valid responsive to said resetting means having been rendered operable and reset said credit register.

10. A metering device of the postage meter or similar type as set forth in claim 9, and sensing means coupled to said coupon accepting means and said validation means for sensing the presence of a coupon in said coupon accepting means and in response thereto actuating said validation means.

11. A metering device of the postage meter or similar type as set forth in claim 9, said resetting means including clutch means.

12. A metering device of the postage meter or similar type as set forth in claim 9, said resetting means including a manually operable control.

* * * * *